Dec. 15, 1953 G. L. RIGGS, JR 2,662,367

INDIVIDUALLY CORRECTED SECONDARY CLOCK

Filed July 24, 1953 2 Sheets-Sheet 1

INVENTOR.
George L. Riggs, Jr.
BY Ross + Ross
Atty & Agent.

Dec. 15, 1953 G. L. RIGGS, JR 2,662,367

INDIVIDUALLY CORRECTED SECONDARY CLOCK

Filed July 24, 1953 2 Sheets-Sheet 2

INVENTOR.

George L. Riggs, Jr.

BY Ross & Ross

Atty. & Agent.

Patented Dec. 15, 1953

2,662,367

UNITED STATES PATENT OFFICE 2,662,367

INDIVIDUALLY CORRECTED SECONDARY CLOCK

George L. Riggs, Jr., Springfield, Mass., assignor to Standard Electric Time Co., Springfield, Mass., a corporation Application July 24, 1953, Serial No. 370,021

7 Claims. (Cl. 58—34)

This invention relates to improvements in clocks and is directed more particularly to improvements in electric clocks of the individually time-corrected type.

The principal object of the invention is the provision of a secondary clock mechanism which is constructed and arranged for use with a master clock and is adapted, for parallel connection with other similar clocks, to be controlled in operation by said master clock and reset accordingly as power failure necessitates such resetting.

According to novel features of the invention, clock mechanism is provided which is characterized by actuating means for normal time indicating or recording operation and reset means operable independently on power failure to synchronize the time indication with that of a master clock.

The novel features of the invention are accomplished in a broad way by the provision of separate drive and reset motors in combination with means for driving time indicating members and means for resetting said members by overriding said driving means on disablement of the drive motor due to power failure.

As a special feature of the invention, the driving means for the time indicating members includes positively engageable means for the driving function obviating slippage and lost motion for accuracy of operation and which is overcome by resetting means for synchronization of the indicating members with a master clock through which and by which energy to the mechanism is controlled.

The clock mechanisms of the invention may be used in parallel with similar mechanism located at separated points each remote from a master clock so that plural clock mechanism may be simultaneously reset or corrected into synchronous relationship.

All of the above objects I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arragement of parts as will be hereinafter more particularly pointed out in the claims hereunto annexed and more fully described and referred to in connection with the accompanying drawings wherein:

Figures 1, 2, 2A, 3, 4, 5:
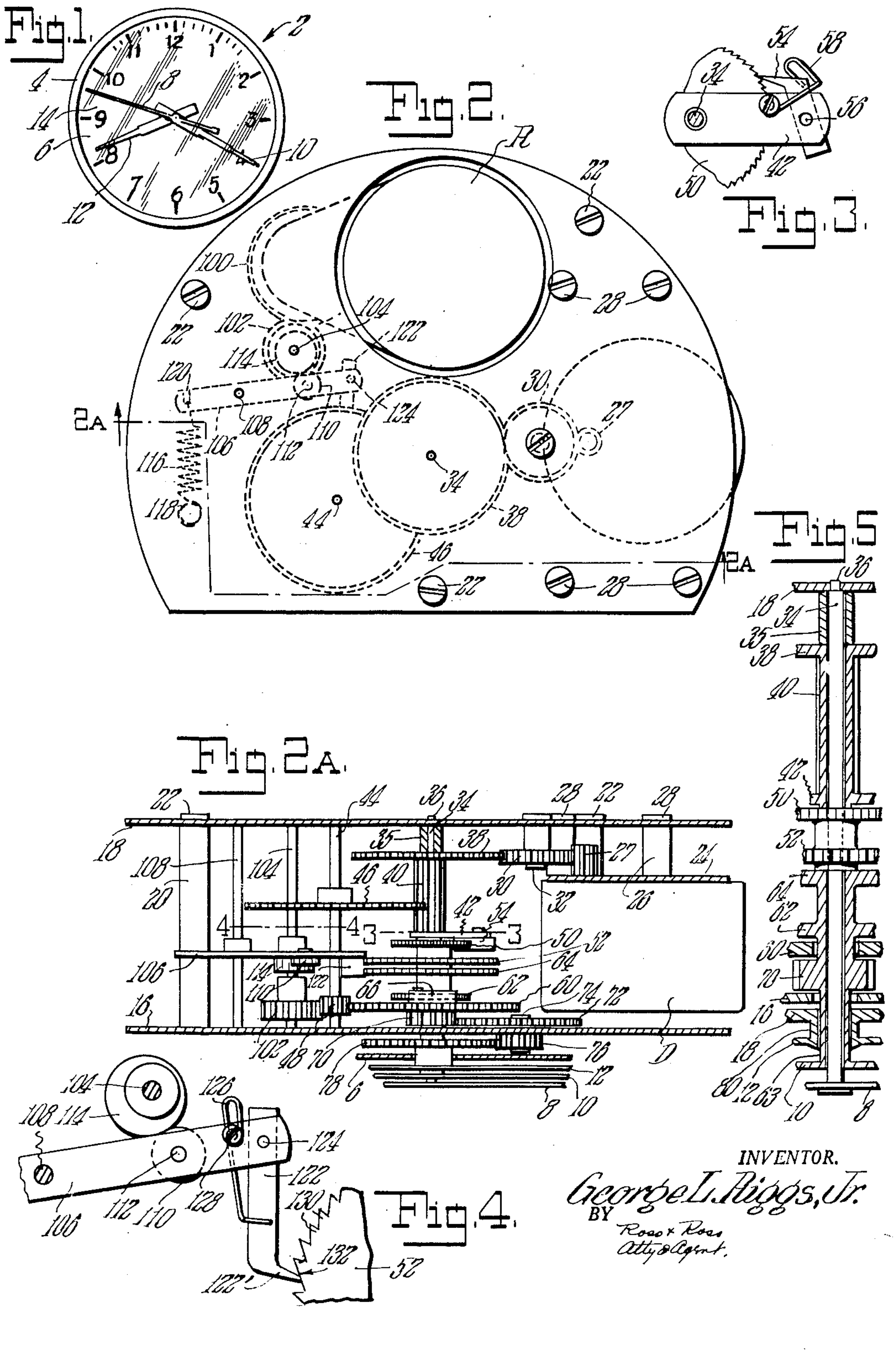
Fig. 1 is a small scale front elevational view of a clock embodying the novel features of the invention.
Fig. 2 is a rear elevational view of the clock mechanism of the clock shown in Fig. 1.
Fig. 2A is a sectional elevational view on the line 2A—2A of Fig. 2.
Fig. 3 is a plan view of the positive clutch drive for the second hand of the clock mechanism, as appears on the line 3—3 of Fig. 2A.
Fig. 4 is a partial plan view of a portion of the reset mechanism as appears on the line 4—4 of Fig. 2A.
Fig. 5 is a longitudinal sectional elevational view, more or less diagrammatic, along the second hand shaft of the clock mechanism.

Referring now to the drawings more in detail, the invention will be fully described.

A clock 2 is shown in Fig. 1 which includes a casing 4, a dial 6 provided with the usual time designations, a second hand 8, a minute hand 10 and an hour hand 12. A transparent member 14 covers the face of the clock as is usual.

It will be understood that the clock mechanism is disposed at the rear of the clock and rearwardly of the dial and rearwardly of such forward casing parts as there may be employed.

A supporting structure for the clock mechanism includes a forward plate 16 and a rear plate 18 which are held and secured together in spaced relation by posts such as 20 and screws 22.

A sub-plate 24 is secured to the rear plate 18 by posts such as 26 and screws 28.

To this plate 24 is secured in any suitable manner a drive motor indicated by D which has an output gear member shown as a drive pinion 27. A drive idler 30 is freely rotatable relative to stud 32 carried by plate 18 and is in mesh with the pinion 27.

An elongated second-hand shaft 34 has an upper end 36 journalled in the rear plate 18. A spacer 35 adjacent the plate 18 rotatably receives the shaft 34. A driven gear 38 has a drive pinion 40 and a radial arm 42 integral therewith which are freely rotatable on said shaft 34. A staff 44 has opposite ends journalled in the plates 16 and 18 and is provided with a driven gear 46 meshing with pinion 40 and with a pinion 48 fixed thereto which is adjacent plate 16. The gear 38 meshes with gear 30, as shown.

An integral driving ratchet wheel 50 and reset ratchet 52 are secured to the second hand shaft adjacent the arm 42 already described. A dog 54 pivoted at 56 to said arm 42 has an outer end for engagement with the teeth of the ratchet wheel 50 and is urged into operative engagement therewith by a spring 58 as shown in Fig. 3. As the drive motor D is energized so that the gear 38 and arm 42 are rotated, the dog 54 acting on wheel 50 brings about rotation of the second hand shaft 34 in the proper direction.

In the resetting function of the mechanism, the wheel 50, as will appear, is rotated past the dog 54 until the dog again resumes its driving function. Thus the arrangement provides a clutch action for positive driving of the shaft 34 and, as distinguished from the common friction devices, slippage and backlash are obviated for the utmost accuracy in operation.

The pinion 48 of staff 44 is in mesh with a minute hand gear 60 which is freely rotatable about the axis of shaft 34. A driving ratchet wheel 62 adjacent gear 60 is integral with a reset ratchet 64 adjacent the reset ratchet 52. Said members 62 and 64 have an elongated sleeve 63 freely rotatable on the shaft 34 and the minute hand 10 is secured to the outer end of said sleeve 63.

A spring-pressed driving dog 66 similar to the dog 54 of Fig. 3 is pivoted to minute hand gear 60 and engages the teeth of driving ratchet 62.

With drive motor D energized and in operation, the second hand shaft 34 and minute hand gear 60 and its sleeve 63 are positively driven through the positive drives of dogs 54 and 66 and ratchets 50 and 62. The ratio of gearing is such as to rotate the second and minute hand in proper timed relation. The reset ratchets 52 and 64 may be rotated simultaneously or independently of one another as will appear and in rotation thereof by the reset means the ratchets 50 and 62 will override the dogs 54 and 66 as is desirable although said dogs and ratchets 50 and 62 provide means for positively actuating the second and minute hands.

The minute hand sleeve 63 has integral therewith a pinion 70 in mesh with a gear 72 on a stud 74 to which is fixed a pinion 76. A gear 78 freely rotatable on the minute hand sleeve 63 meshes with pinion 76 and has a sleeve 80 which carries the hour hand 12 whereby the hour hand is actuated by the minute hand in proper timed relation.

By the mechanism thus described, the hour, minute and second hands are rotated in timed relation accordingly as drive motor D is energized but interruption of power to the motor D results in incorrect indication of time. According to the invention, means to be described is provided for resetting of the minute and second hands to the correct time in case of power failure.

A reset motor R, see Fig. 2, is secured to inner plate 16 and has an output driving gear 100 which is in mesh with a driven gear 102 fixed to a staff 104 journalled at its opposite ends in the plates 16 and 18.

A lever 106 is fixed to a staff 108 having its opposite ends oscillatable in plates 16 and 18. A cam roll 110 is rotatable at 112 on said lever 106 and is in operative engagement with a cam 114 fixed to driven staff 104. Said cam 114 in the present preferred form of the invention is in the shape of a disc eccentrically disposed relative to the axis of the staff 104. A spring 116 has opposite ends connected to an anchor 118 fixed to plate 16 and a notch 120 of the lever 106 for urging the roll 110 into engagement with the cam 114.

A reset pawl 122 is pivoted at 124 to the lever 106 and a spring 126 has one end secured to the lever at 128 and an outer end acting on said pawl to urge it counterclockwise, see Fig. 4. The outer end 122′ of the pawl is formed to engage the teeth 130 of the reset ratchet 52 and the teeth of the reset ratchet 64 which ratchets may be termed the second and minute reset ratchets.

Said ratchets 52 and 64 each have a space or dwell such as 132 of ratchet 52. Said dwells may be formed by removing a tooth of the ratchets as shown or they may be smooth surface portions between adjacent teeth or an outwardly extending smooth peripheral portion. Preferably these ratchets 50 and 64 will have fifty-nine teeth and a dwell which will take the place of a tooth as though there were sixty teeth. For each tooth of ratchet 52 it is moved through an angle equal to one second, each tooth of ratchet 64 represents an angle equal to one minute on the dial.

With the reset motor R energized and in operation, the lever 106 is swung back and forth. As shown, ratchet 52 is so positioned that the pawl end 122′ is disposed on the dwell 132 thereof. In this position oscillations of the lever 106 would cause the end of the pawl to move back and forth on the dwell rather than actuate the ratchet.

Figures 5A, 6:
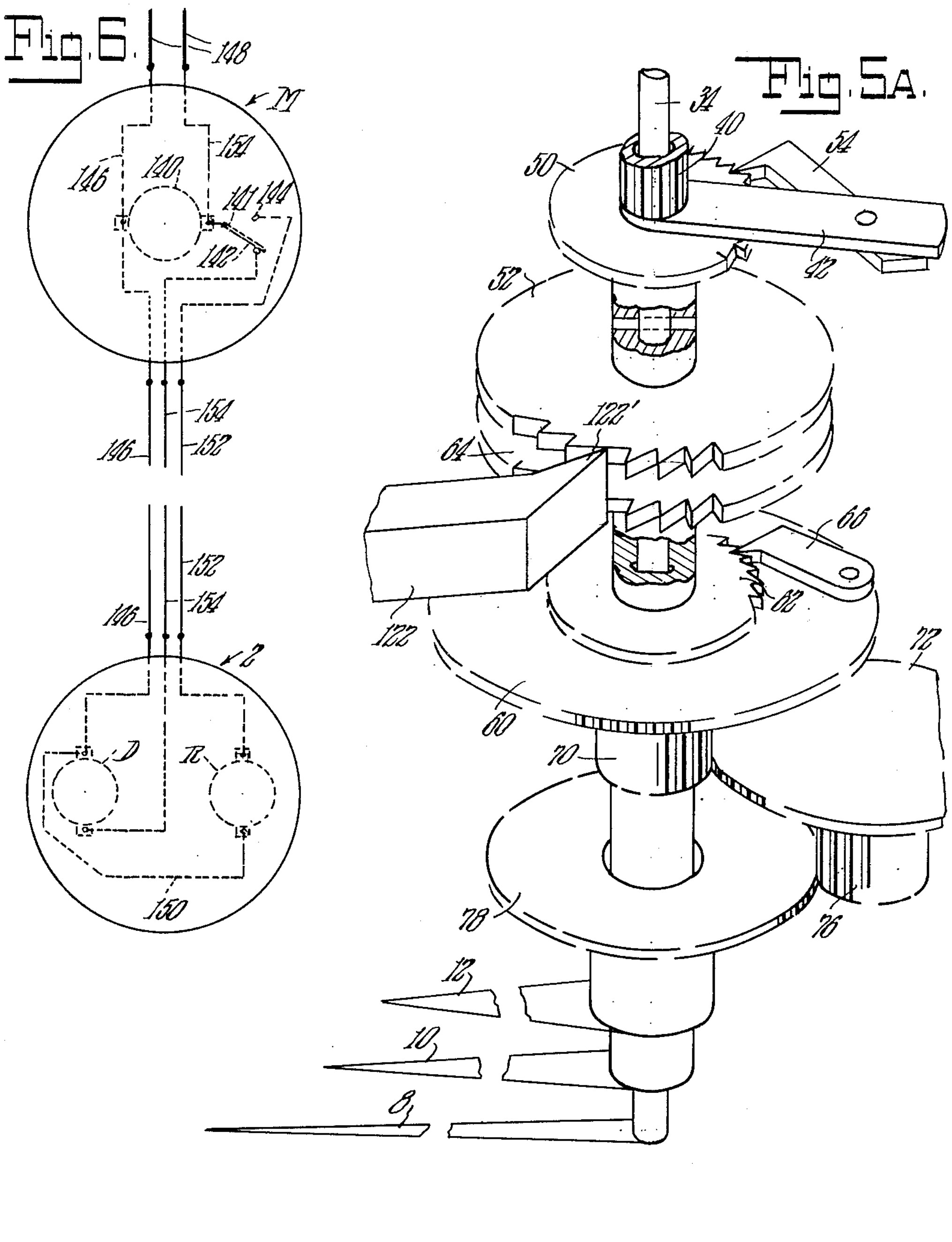
Fig. 5A is an enlarged perspective view in more or less diagrammatic form showing the means for driving the time indicating members and the means for resetting same upon the disablement of the drive motor.
Fig. 6 is a diagrammatic view showing the clock of the invention connected to a master clock.

In Fig. 6 there is shown diagrammatically a master clock M for controlling the operation of the clock 2. The clock M has a motor 140.

It will be assumed that said clock M is of the type having secondary mechanism such as a spring motor for continuing the operation thereof following power failure. Also that said master clock is provided with means operable on power failure to move a switch arm from power supply position to reset position and that said switch arm on reestablishment of power will remain in said reset position for a predetermined interval of time and then return to the power position.

In other words, on power failure the switch of the master clock is positioned for resetting a clock or clocks of the individually corrected type. When power is restored the switch remains in resetting position for a time interval and thereafter it is positioned for normal operation of the clock or clocks controlled thereby.

The gearing of the clock mechanism is such that in the normal operation thereof the drive motor D operates to drive the second, minute and hour hands in proper timed relation. That is, with relation to the time designations shown, the hour hand rotates through three hundred sixty degrees in twelve hours, the minute hand in sixty minutes and the second hand in one minute. Obviously the mechanism may be arranged for a twenty-four hour cycle or otherwise as may be desired.

The reset mechanism is arranged for operation on failure of power to the drive motor D. For purposes of disclosure power to the drive motor D or to the drive motors of a plurality of such mechanisms will be supplied through and under the control of a master clock at a location somewhat remote from the clock. As is well known, motor driven master clocks are commonly provided with secondary mechanisms, for operating the clock for an interval of time following power failure.

As the mechanism of the master clock and the clock hereof are disabled by lack of power, the secondary mechanism of the master clock then functions to operate the master. When electrical power is reestablished power is then supplied through the master clock to reset motor R for such an interval of time as may be predetermined, say thirty-five seconds. During this interval, the reset mechanism operates to reset the minute and second hands to the correct time or advances them according to the seconds and/or minutes lost during the disablement.

During the normal operation of the drive motor the ratchet wheels 50 and 62 are positively driven by their respective dogs and the reset ratchets 52 and 64 are rotated simultaneously therewith so that the teeth of the reset ratchets click past the pawl 122. When the drive motor D becomes disabled the pawl 122 lies behind the teeth of reset ratchets 52 and 64.

As the reset motor R is energized the lever 106 swings back and forth whereby the ratchet wheels 52 and 64 are rotated in a step by step manner to rotate the minute and second hands.

When the dwells of the ratchet wheels 52 and 64 arrive at the pawl point the second and minute hands will register with the predetermined time indication of the dial and said point will traverse the dwells of the ratchets during the remainder of the resetting cycle of the reset motor R.

The driving connections between the reset motor R and lever 106 are such that during the resetting operation the second and minute hands are rotated at a speed greater than the normal speed as when rotated by the drive motor D. For this purpose, the dogs engageable with the ratchet wheels 50 and 62 allow the teeth of these drive ratchet wheels to click therepast.

The dwells of the reset ratchets 52 and 64 are related to the second and minute hands so that when the dwells are positioned adjacent the point of pawl 122 the said minute and second hands will be in register with a certain predetermined time graduations of the clock dial say, for instance, on an even hour. The master clock will then be arranged so that on that even hour power is removed from the reset motor and restored to the drive motor whereupon the driving mechanism is operated and the hands having been reset the time by the clock is synchronized with that of the master clock.

To that end for illustration as in Fig. 6, a switch arm 141 associated with clock M makes contacts 142 and 144 and the motor is connected by 146 to power line 148 and to drive motor D of clock 2. Drive motor D is connected by 150 to reset motor R. The contact 144 of clock M is connected by 152 to the reset motor R and drive motor is connected by 154 to contact 142. The switch arm is connected to motor 140, as shown.

As will be seen, the switch arm 141 which is operated by the clock M may connect the drive motor D or the reset motor of the clock to the power line for the purpose previously described.

It will be understood that the power line and the motors may be in all cases A. C. having the phase characteristics desired.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Individually corrected secondary clock apparatus comprising in combination, separate drive and reset motors arranged for independent operations, indicating members for indicating minutes and seconds, gear mechanism driven by said drive motor and including a separate drive ratchet and pawl means for actuating each of said indicating members, and reset mechanism driven by said reset motor and including a reset ratchet integral with each of said drive ratchets and pawl means for rotating the reset ratchets and overriding the pawl means of said gear mechanism.

2. Individually corrected secondary clock apparatus comprising separate drive and reset motors arranged for independent operations, indicating members for indicating minutes and seconds of time, a clock train operatively connected to and driven by said drive motor including means for driving said minutes indicating member and means for driving said seconds indicating member, each of said means including a pawl member and integral drive and reset ratchets actuated thereby, and reset mechanism responsive to and driven by said reset motor and engageable with the reset ratchet of each of said means for imparting movement thereto during the resetting operation.

3. In a system for correcting secondary clocks in response to a signal from a master clock comprising in each secondary clock of the system, separate drive and reset motors arranged for independent operations, indicating members for indicating minutes and seconds, positive drive means driven by said drive motor and including separate drive ratchets and dogs for actuating each of said time indicating members, and reset mechanism connected to and driven by said reset motor and including a reset ratchet intergral with each of said drive ratchets, and pawl means for rotating the reset ratchets and overriding said dogs.

4. In a timekeeping apparatus, a driving motor adapted to operate continuously at a uniform time rate, time indicating members, driving connections including driving ratchets between said driving motor and each of said time indicating members for driving the latter at a normal timekeeping rate, a reset motor, a resetting ratchet connected to each of said driving ratchets, and connections between said reset motor and said resetting ratchets for driving said driving ratchets at a rate in excess of their normal timekeeping rate upon energization of said reset motor.

5. In a time device having time indicating means, a normal drive motor, a clock train connecting said drive motor to the time indicating means and including a separate drive ratchet and pawl means for actuating each element of the time indicating means, a reset motor adapted to be energized by current transmitted thereto by a contact made at a remote point, and reset means responsive to and driven by said reset motor and including reset ratchets connected to each of the drive ratchets of said clock train and pawl means for rotating the reset ratchets and overriding the pawl means of said clock train upon energization of said reset motor.

6. Individually corrected secondary clock apparatus comprising in combination, separate drive and reset motors arranged for independent operations, indicating members for indicating minutes and seconds of time, gear mechanism driven by said drive motor and including for each said indicating members, positive drive means for rotating each of said indicating members in one direction at one speed and adapted to be rendered ineffective by reset mechanism, and reset mechanism driven by said reset motor and including a member for rendering said drive means ineffective and overriding the same to drive said indicating means.

7. In a system for correcting a secondary clock in response to energy from a master clock, separate drive and reset motors arranged for independent operations, time indicating members, a clock train driven by said drive motor and including separate means for actuating each of said time indicating members, correcting mechanism responsive to and driven by said reset motor and inculding pawl means for imparting movement to the actuating means of said clock train upon energization of said reset motor.

GEORGE L. RIGGS, Jr.

References Cited in the file of this patent

UNITED STATES PATENTS

| Number | Name | Date |
|---|---|---|
| 1,723,964 | Wood | Aug. 6, 1929 |
| 1,989,605 | Poole | Jan. 29, 1935 |
| 2,058,609 | Magro | Oct. 27, 1936 |
| 2,198,632 | Mullan | Apr. 30, 1940 |
| 2,274,221 | Stone | Feb. 24, 1942 |
| 2,447,798 | Deane | Aug. 24, 1948 |
| 2,555,408 | Horner | June 5, 1951 |